United States Patent
Le Quere

(10) Patent No.: US 9,746,114 B2
(45) Date of Patent: Aug. 29, 2017

(54) CARTRIDGE TYPE QUICK COUPLING DEVICE

(71) Applicant: Parker Hannifin Manufacturing France SAS, Annemasse (FR)

(72) Inventor: Philippe Le Quere, Betton (FR)

(73) Assignee: PARKER HANNIFIN MANUFACTURING FRANCE SAS, Annemasse (FR)

( * ) Notice: Subject to any disclaimer, the term of this patent is extended or adjusted under 35 U.S.C. 154(b) by 70 days.

(21) Appl. No.: 14/556,541

(22) Filed: Dec. 1, 2014

(65) Prior Publication Data
US 2015/0152989 A1     Jun. 4, 2015

(30) Foreign Application Priority Data

Nov. 29, 2013 (FR) ...................................... 13 61907

(51) Int. Cl.
*F16L 37/091* (2006.01)
*F16L 37/084* (2006.01)

(52) U.S. Cl.
CPC ......... *F16L 37/0841* (2013.01); *F16L 37/091* (2013.01); *F16L 37/0915* (2016.05)

(58) Field of Classification Search
CPC .. F16L 37/0841; F16L 37/0915; F16L 37/091
USPC .................................. 285/340, 39, 319, 308
See application file for complete search history.

(56) References Cited

U.S. PATENT DOCUMENTS

| 5,174,611 A * | 12/1992 | Byrd ...................... F16L 33/227 285/305 |
| 5,911,443 A * | 6/1999 | Le Quere ............ F16L 37/0915 285/23 |
| 6,447,019 B1 * | 9/2002 | Hosono ............... F16L 37/0915 285/148.19 |
| 7,475,913 B2 * | 1/2009 | Muto .................. F16L 37/0915 285/104 |

(Continued)

FOREIGN PATENT DOCUMENTS

| DE | 10 2011 109787 A1 | 2/2013 |
| DE | 10 2011 109788 A1 | 2/2013 |

(Continued)

OTHER PUBLICATIONS

Search Report for corresponding French Application No. 1361907 dated Jul. 16, 2014.

*Primary Examiner* — Gregory Binda
*Assistant Examiner* — Zachary Dragicevich
(74) *Attorney, Agent, or Firm* — Renner, Otto, Boisselle & Sklar, LLP

(57) ABSTRACT

A quick coupling device of the cartridge type, the device comprising a tubular body defining a channel, a retaining washer for retaining the tube in the device, a tubular disconnection pusher that is slidably mounted in the channel, and an anchor for anchoring the coupling device in the socket. The body has one end provided with a retractable ring that projects axially from the end in order to carry internally a sealing member of the coupling device and in order to be suitable for being returned against the body in order to release the sealing member in the socket. The retaining washer is arranged in the retractable ring between the body and the sealing member.

14 Claims, 3 Drawing Sheets

(56) References Cited

U.S. PATENT DOCUMENTS

| | | | | |
|---|---|---|---|---|
| 7,533,907 B2* | 5/2009 | Swift | ............... | F16L 37/002 |
| | | | | 285/321 |
| 2005/0104367 A1* | 5/2005 | Le Quere | ............. | F16L 37/091 |
| | | | | 285/18 |
| 2005/0173922 A1* | 8/2005 | Coquard | ............ | F16L 37/0915 |
| | | | | 285/308 |

FOREIGN PATENT DOCUMENTS

| | | | |
|---|---|---|---|
| FR | 2 876 774 A1 | 4/2006 | |
| FR | 2 958 713 A1 | 10/2011 | |
| FR | WO 2011128390 A1 * | 10/2011 | ............ F16L 37/091 |
| WO | 2006/037971 A1 | 4/2006 | |

* cited by examiner

CARTRIDGE TYPE QUICK COUPLING DEVICE

PRIORITY

This application claims priority of French Patent Application No. 1361907 filed Nov. 29, 2013, which is hereby incorporated herein by reference.

FIELD OF THE INVENTION

The present invention relates to a quick coupling device for coupling a tube to an element of a fluid transport circuit. The invention relates more particularly to quick coupling devices of the cartridge type.

BACKGROUND OF THE INVENTION

Cartridge type quick coupling devices are known for inserting in a cylindrical socket formed in an element of a fluid transport circuit, such as a pump, a manifold, an actuator, a pneumatic module, a flow or pressure regulator, or indeed another tube. Such a device generally comprises a tubular body provided internally with a toothed washer for retaining a tube and provided externally with anchor means for anchoring the device in the cylindrical socket.

The device often includes a tubular disconnection pusher that is slidably mounted in a channel of the tubular body to move between an extended portion and a pushed-in position and that serves, on being pushed into the body, to act on the teeth of the tube-retaining washer in order to cause the tube to be released.

In a particularly elaborate version, at its end opposite from the pusher, the body of the device has an axially projecting end from which there extends a protection ring that carries an annular sealing gasket. While the device is being inserted in the socket, the protection ring comes to bear against an inlet shoulder of a housing in the socket and it becomes detached from the end of the body so as to slide over the body while the device is being inserted until it becomes retracted so that the annular sealing gasket is pushed on its own into the housing in the socket.

In general, the portion of the body carrying the protection ring and on which the protection ring slides is secured to an insert that is clipped in the body and that slidably receives the pusher. The insert makes it simpler to assemble the retaining washer so that it is captive between the body and the insert.

In certain applications, and in particular in pneumatic installations that include equipment connected by multiple tubes to other elements of the pneumatic circuit in such an installation, installers seek to provide equipment that is ever more compact and lighter in weight. Such specifications involve in particular reducing the spacing between tubes that serve to connect pieces of equipment to other elements of the pneumatic circuit. This spacing is linked in particular with the diameter of the sockets receiving the cartridge quick coupling devices, and thus with the overall size of the cartridges.

Initial work has sought to reduce the thicknesses of the materials constituting the elements of the cartridge. Nevertheless, it has been found that it is not possible to obtain any significant reduction using the materials that are normally used, such as synthetic materials suitable for injection molding, without comprising the mechanical characteristics of the device.

Proposals have also been to use other materials that are stronger, such as steel, however shaping operations (stamping or machining) make that solution uneconomic. Finally, the increase in weight resulting from the use of such materials is incompatible with the targets of installers for light weight.

SUMMARY OF THE INVENTION

The present invention provides a cartridge type coupling device having overall size that is smaller than that of existing devices.

More particularly, the invention provides a quick coupling device of the type comprising a cartridge for inserting in a socket of a circuit element for connection to a tube of longitudinal axis. The device comprises a tubular body defining a channel, a retaining washer for retaining the tube in the device, a tubular disconnection pusher that is slidably mounted in the channel and that defines a duct for passing the tube, and anchor means for anchoring the coupling device in the socket. The body has an end provided with a retractable ring that projects axially from said end in order to carry internally an annular sealing member of the coupling device and in order to be suitable for being returned against the body in order to release the annular sealing member in the socket. According to the invention, the retaining washer is arranged in the retractable ring between the body and the annular sealing member.

This arrangement makes it possible to avoid using an insert for mounting the retaining washer, thereby reducing the radial size of the device.

Advantageously, the spacer is substantially annular in shape and has a transversely-extending first face in contact with the annular sealing gasket and a second face opposite from the first face and including an internal chamfer. This makes it possible to ensure that contact between the first face and the sealing gasket is uniform, while leaving freedom for the teeth of the retaining washer to move when the disconnection pusher is actuated.

In a preferred embodiment, the protection ring is connected to the central bushing via a breakable wall, thereby contributing to reducing the size of the device and also its production costs.

Preferably, the means for anchoring the tubular body in the housing comprise an externally-anchoring washer carried by the tubular disconnection pusher.

In a particular embodiment, the end of the tubular pusher that faces the tube retaining washer includes at least one axial slot. This slot provides greater flexibility for the end of the tubular pusher and facilitates mounting it in the quick coupling device.

BRIEF DESCRIPTION OF THE DRAWINGS

Other characteristics and advantages of the invention appear on reading the following description of a particular, non-limiting embodiment of the invention given with reference to the accompanying figures, in which.

DETAILED DESCRIPTION OF THE INVENTION

Figure 1:
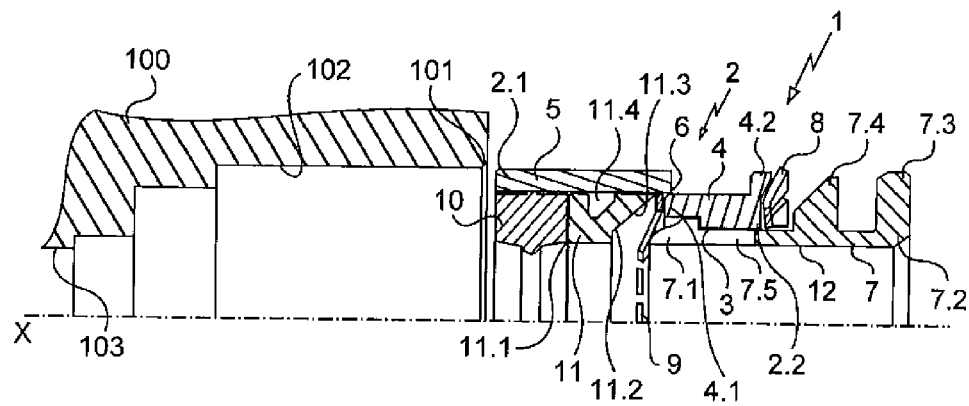
FIG. 1 is a half-view in section of the device of the invention, before being installed in the socket.

FIGS. 1 to 5 show a quick coupling device of the cartridge type given overall reference 1 and for inserting via an opening 101 into a socket 102 of a circuit element 100. The socket 102 is in fluid flow communication with a channel 103 of the circuit element 100 that is to be connected to a tube 104 (drawn in dashed lines in FIG. 5) once the tube has been engaged in the coupling device 1.

The coupling device 1 comprises a body given overall reference 2 that is of tubular shape, extending along a longitudinal axis X and defining an internal channel 3. The body 2 has a first end 2.1 through which the device 1 is to be engaged in the socket 102, and a second end 2.2 that is to extend in the vicinity of the opening 101 when the device is in the socket 102.

More precisely, the body 2 is in the form of a central bushing 4 having a shoulder 4.2 beside the end 2.2 of the body 2 and an opposite end 4.1 to which a retractable ring 5 is connected that projects axially from the end 4.1. The retractable ring 5 is connected by a breakable wall 6 to the end 4.1 of the central bushing 4. The retractable ring 5 is longer than the length of the central bushing 5 between the end 4.1 and the shoulder 4.2. The coupling device 1 also has a disconnection pusher 7 of tubular shape that is slidably mounted inside the channel 3.

At its first end 7.2 that projects axially beside the end 2.2 of the body 2, the disconnection pusher 7 has a first annular shoulder 7.3 followed by a second annular shoulder 7.4 of frustoconical shape with its smaller diameter portion facing an externally-anchoring washer 8. The second annular shoulder 7.4 is formed by a surface of a collar of outside diameter that is substantially equal to the diameter of the socket 102 such that said collar serves to guide the disconnection pusher 7 in the socket 102. The second end 7.1 of the disconnection pusher 7 faces an internally-toothed washer 9 for retaining the tube 104, and it is chamfered in such a manner as to be capable of lifting the teeth of said internally-toothed washer 9 when the disconnection pusher 7 is pushed into the body 2. The end 7.1 of the disconnection pusher 7 has two axial slots 7.5 at 180° from each other and extending over approximately one-third of the length of the disconnection pusher 7. The slots 7.5 make it easier to put the anchoring washer 8 and the central bushing 4 into place on the disconnection pusher 7.

The disconnection pusher 7 defines a duct 12 for passing the tube 104 and it carries the anchoring washer 8 situated between the second shoulder 7.4 of the disconnection pusher 7 and the shoulder 4.2 of the central bushing 4.

Because the externally-anchoring washer 8 is carried by the disconnection pusher 7, the externally-anchoring washer 8 is held in position relative to the other elements of the device 1, in particular by means of the disconnection pusher 7 and because it is in contact with the disconnection pusher 7.

The retractable ring 5 is described below in detail. Internally, and in succession from its distal end to the end 4.1 of the central bushing 4, it carries an annular sealing gasket 10, a spacer 11, and the internally-toothed washer 9 for retaining the tube 104. The spacer 11 is angular in shape with an inside diameter that is greater than the outside diameter of the tube and it is mounted in the retractable ring 5 between the sealing gasket 10 and the internally-toothed retaining washer 9. The fact that the retractable ring 5 carries internally the sealing gasket 10, the spacer 11, and the internally-toothed washer 9 means that these elements are held in position relative to the other elements of the device 1, in particular by means of the retractable ring 5 and because they are in contact therewith.

Figure 3:
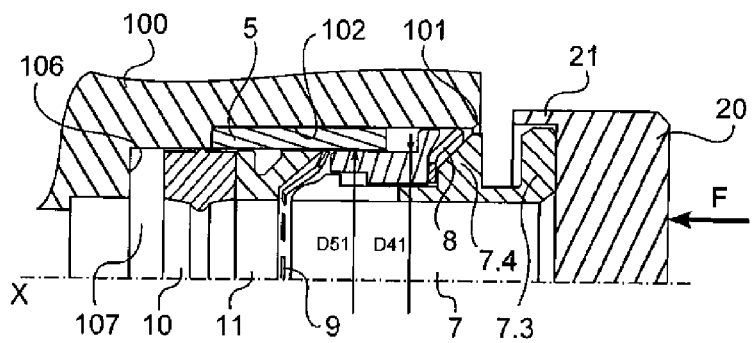
FIG. 3 is a half-view in section of the FIG. 1 device while the device is being inserted into the socket.
Figure 4:
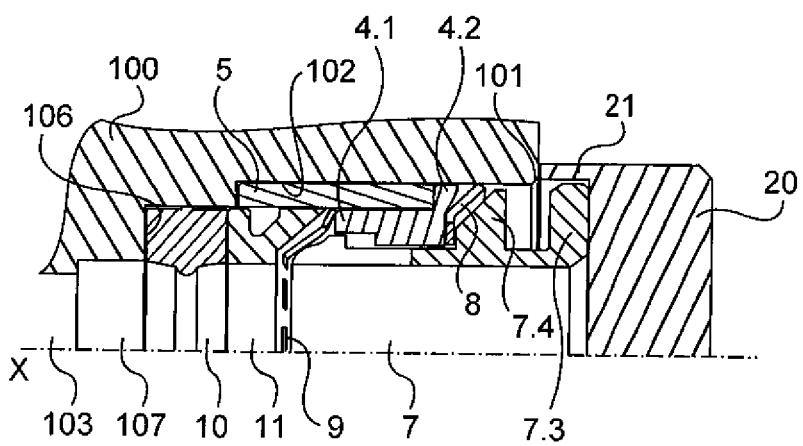
FIG. 4 is a half-view in section of the FIG. 1 device at the end of insertion of the device into the socket.
Figure 5:
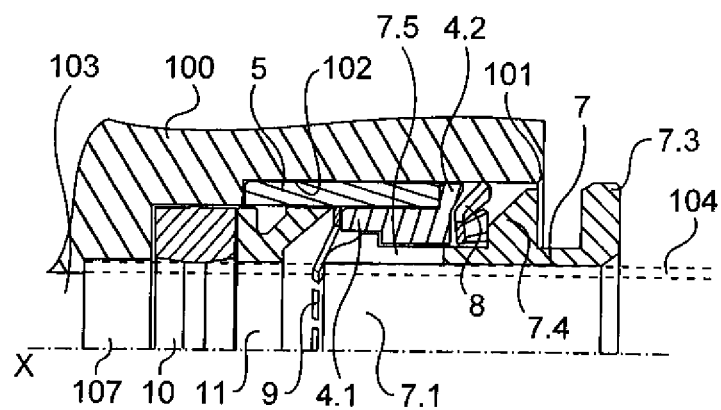
FIG. 5 is a half-view in section of the FIG. 1 device, in position in the socket and connected to a tube.

The retractable ring 5 has an outside diameter D51 that is slightly greater than the outside diameter D41 of the central bushing 4 (see FIG. 3). The retractable ring 5 can thus slide in an axial direction over a distance that is slightly greater than the width of the sealing gasket 10 before coming into abutment against the face of the shoulder 4.2 facing away from the end 2.2 of the tubular body 2.

With reference to FIGS. 1 to 5, there follows a description of how the quick coupling device 1 is put into place in the socket 102.

Figure 2:
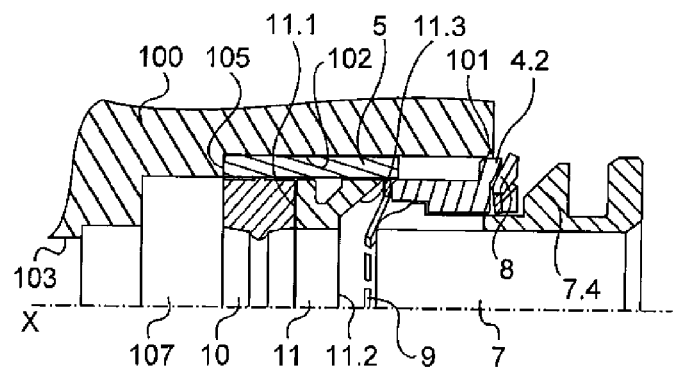
FIG. 2 is a half-view in section of the FIG. 1 device after being installed in the socket.

During insertion of the coupling device 1 into the socket 102, the end of the retractable ring 5 comes into abutment against a shoulder 105 in the socket 102 (FIG. 2).

The installer then places a cylindrical mounting bell 20 to bear against a radial face of the shoulder 7.3 of the disconnection pusher 7 (FIG. 3). A circular rim 21 projects from the mounting bell 20 and extends around the shoulder 7.3 so as to facilitate centering the mounting bell 20 on the disconnection pusher 7 and so as to avoid it being pushed in too far, as described below. The user then applies a moderate insertion force F (in this example less than or equal to 50 decanewtons (daN)) on the face of the mounting bell 20 facing away from its face that is pressed against the shoulder 7.3. This force F causes the shoulder 7.4 of the disconnection pusher 7 to come into abutment against the shoulder 4.2 of the central bushing by compressing the anchoring washer 8. For this purpose, the shapes of these three elements are complementary and they are arranged to reduce the portions of the teeth of the anchoring washer 8 that project radially from the body 2 when it is clamped between the shoulders 7.4 and 4.2, thus making it easier to insert the anchoring washer 8 into the socket 102.

While subjected to the insertion force, the breakable wall 6 breaks and then allows the retractable ring 5 to slide relative to the remainder of the coupling device 1. Thus, the movement of the tubular disconnection pusher 7 in abutment against the central bushing 4 causes the central bushing 4 to move in translation relative to the retractable ring 5 and to the socket 102, thereby pushing the elements carried by the retractable ring 5 (specifically the internally-toothed washer 9, the spacer 11, and the sealing gasket 10) towards a housing 107 in the socket 102. This movement in translation continues until the edge of the circular rim 21 comes to bear against the circuit element 100. This corresponds to the radial face of the sealing gasket 10 coming into abutment against a wall 106 of the housing 107. It should be observed that a portion of the spacer 11 is then also received in the housing 107, while the remainder of the spacer 11 and the internally-toothed washer 9 remain in the portion of the retractable ring 5 that continues to project from the central bushing 4. The user then removes the mounting bell 20. Under the effect of the teeth of the internally-toothed washer 9 returning into position, the disconnection pusher 7 returns to its initial position against an internal abutment of the central bushing 4. In so doing, the disconnection pusher 7 disengages from the anchoring washer 8 (FIG. 5) which anchors the quick coupling device 1 in the socket 102. The tube 104 can then be inserted into the duct 12 of the disconnection pusher 7 in order to be hermetically coupled to the channel 103. In this position, it should be observed that the collar forming the shoulder 7.4 faces the inside wall of the socket 102 and serves to guide and center the disconnection pusher 7 in the socket 102.

This provides a quick coupling device in which the thickness of the ring 5 contributes to its mechanical strength when the device is in place, thereby making it possible to reduce the overall size of the device.

When the circuit that includes the device of the invention is put under pressure, care should be taken to ensure that in spite of the relatively large reverse movement of the cartridge, the sealing gasket 10 preferably remains entirely within the housing 107 so as to avoid any risk of leakage. Such reverse movement occurs for example when the socket 102 is made of a material that is relatively soft: the teeth of the anchoring washer 8 then penetrate more deeply into the soft material.

Figure 6:
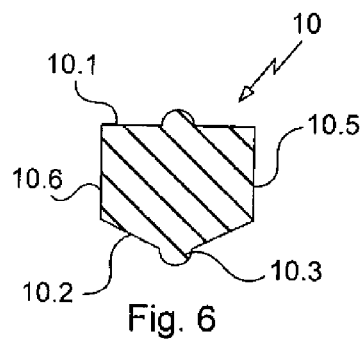
FIG. 6 is a section view of an annular sealing gasket of the FIG. 1 device.

Preferably, and with reference to FIG. 6, the sealing gasket 10 in this example is a gasket having respective beads on its outer and inner circumferences 10.1 and 10.2, with the beads 10.3 of the inner circumference 10.2 being connected to at least one of the side faces 10.4 and 10.5 of the sealing gasket 10 via a frustoconical surface that is not tangential to the inner bead 10.3.

Advantageously, the spacer 11 is substantially annular in shape and has a transversely-extending first face 11.1 in contact with the sealing gasket 10 and a second face 11.2 opposite from its first face that includes an internal chamfer 11.3.

The internal chamfer 11.3 enables the teeth of the internally-toothed washer 9 to be opened when the tube 104 goes past or when actuating the disconnection pusher 7.

The outside surface of the spacer 11 is also provided with an annular groove 11.4—in this example of substantially triangular section—thereby saving material and weight, and avoiding the phenomenon of the material of the spacer shrinking, thus ensuring improved geometrical compliance. Finally, the fact that this groove is not arranged symmetrically about the axis of the part means that it can be used as keying means in machines for automatically manufacturing the quick coupling device 1.

The anchoring washer 8 is described below in greater detail with reference to FIGS. 7 to 12.

The anchoring washer 8 is made of metal and it has teeth 8.1 connected together via circumferential portions 8.2 so as to be elastically deformable between a rest state in which the anchoring washer 8 has an outside diameter greater than the diameter of the socket 102, and a deformed state in which the anchoring washer 8 has an outside diameter less than the diameter of the socket 102. Each tooth 8.1 has a free portion with a terminal edge 8.3 for biting into the wall of the socket and a portion that is connected to circumferential portions.

It has been observed that in order to bite into a material that is hard (e.g. steel), it is advantageous for the terminal edge to present a shape that enables stresses to be concentrated locally against the wall of the socket, whereas in order to bite into a material that is soft (e.g. a synthetic material such as polyamide), it is advantageous for the terminal edge to present a shape that leads to a relatively large length/area of contact with the wall of the socket.

According to a particularly advantageous first characteristic, the free portion of each tooth is enlarged relative to its connected portion, and the terminal edge includes at least one portion for increasing stress concentration at a distance from the ends of the terminal edge. The portion for increasing stress concentration at a distance from the ends of the terminal edge makes it easier to penetrate into materials that are relatively hard. Enlarging the free portion and positioning the portion that encourages stress concentration at a distance from the ends of the terminal edge makes it possible to have a relatively large contact length/area with the wall of the socket when it is made of a material that is relatively soft.

Figures 11, 12:
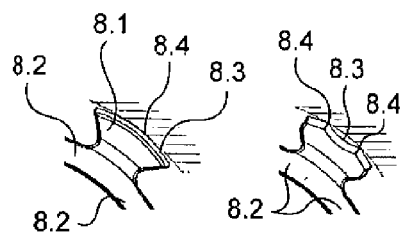
FIG. 11 is a detail view of the anchoring washer of FIGS. 7 and 8.
FIG. 12 is a detail view of the anchoring washer of FIGS. 9 and 10.
Figures 7, 8:
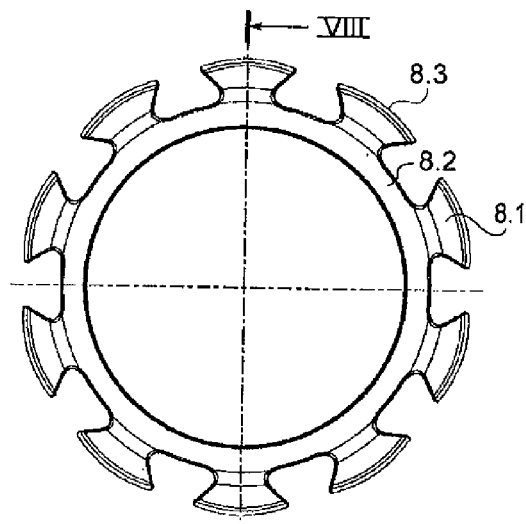
FIG. 7 is a detail view of the anchoring washer of the FIG. 1 device.
FIG. 8 is a section view on axis VIII-VIII showing the FIG. 7 washer.

In a preferred embodiment shown in FIGS. 7, 8, and 11, the anchoring washer 8 has outwardly-projecting teeth 8.1, the teeth being connected together in pairs by a flat circumferential portion 8.2 that is elastically deformable in twisting to enable the teeth to move between a state for allowing the body 2 to pass freely in the socket 102 and a state for anchoring the body 2 in the socket 102. The teeth 8.1 slope rearwards relative to a main plane of the anchoring washer 8 in order to encourage the teeth 8.1 to penetrate into the wall of the socket 102 when the device moves in reverse (e.g. when the circuit is put under pressure).

The free portion 8.1 of each tooth is enlarged relative to its connected portion 8.2, and the terminal edge 8.3 includes a portion 8.4 for increasing stress concentration at a distance from the ends of the terminal portion. The terminal edge 8.3 is a segment of a circle of diameter smaller than the diameter of the socket, the free portion of the tooth 8.1 being convex in shape. In this way, the terminal edge 8.3 comes into contact with the wall of the socket 102 via its central portion only (which constitutes the portion 8.4), thereby concentrating stresses in the contact zone, and thus facilitating penetration of the teeth into the material. When the material of the wall of the socket is a material that is relatively soft, the penetration of each tooth 8.1 serves to put a larger portion of the terminal edge 8.3 into contact with the material constituting the wall of the socket, thereby spreading the stresses and increasing the mechanical strength of the anchoring.

Figures 9, 10:
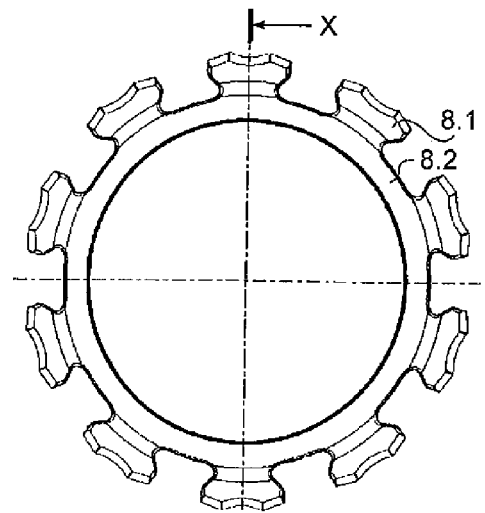
FIG. 9 is a detail view of the anchoring washer in a variant embodiment.
FIG. 10 is a section view on axis X-X of the FIG. 9 washer.

In the variant of FIGS. 9, 10, and 12, the free portion of each tooth 8.1 is, as above, enlarged relative to the connected portion 8.2, and the terminal edge 8.3 has two portions 8.4 for increasing stress concentration at a distance from the ends of the terminal portion 8.3. The terminal edge 8.3 has two end portions of convex rounded shape that are connected together by a central portion of concave rounded shape. Between each of the end portions and the concave end portion there is formed a spike forming one of the portions 8.4. Thus, the terminal edge 8.3 comes into contact with the wall of the socket 102 via its portions 8.4 only, thereby concentrating stresses in these two contact zones, and thus facilitating penetration of the teeth into the material. When the material of the wall of the socket is a relatively soft material, the penetration of each tooth 8.1 serves to put a larger portion of the terminal edge 8.3 into contact with the material constituting the wall of the socket, thereby spreading the stresses and increasing the mechanical strength of the anchoring.

Naturally, the invention is not limited to the embodiment described but covers any variant coming within the ambit of the invention as defined by the claims.

In particular:

although the tube is anchored by means of an anchoring washer, the invention also applies to other anchoring means such as, for example, a resilient ring or a conical sleeve for applying restraint between the tube and the socket;

although each tooth 8.1 in this example has an enlarged free end, the teeth 8.1 could be straight in shape (having their sides defined by parallel edges) or they could be tapering in shape (having their sides defined by radial edges). These shapes are nevertheless better adapted for biting into materials that are relatively hard, such as steel. Furthermore, although particularly advantageous in the device of the invention, anchoring washers with enlarged teeth such as those shown in FIGS. 7 to 12 are suitable for use in anchoring any element in a socket;

although in the present example the retractable ring is connected to the central bushing by a breakable wall, the invention also applies to other kinds of connection between the ring and the central bushing, for example a connection via adhesive, clip-fastening, or as a tight fit;

although the tubular disconnection pusher in this example has two axial slots, the invention also applies to a pusher having some other number of axial slots, e.g. a single axial slot, or three or even four instead of two; the pusher may also have no slot, depending on the stiffness of the materials used;

although the tube is sealed in the socket in this example by an annular sealing gasket having inner and outer beads, the invention also applies to other types of annular sealing member such as a gasket having no beads, an annular gasket of rectangular section, of circular section, or of arbitrary section. Sealing may also be obtained by using two sealing gaskets, optionally made of different materials.

The invention claimed is:

1. A quick coupling device in the form of a cartridge for inserting in a socket of a circuit element for connection to a tube having a longitudinal axis, the device comprising:
a tubular body defining a channel,
a retaining washer for retaining the tube in the device,
a tubular disconnection pusher that is slidably mounted in the channel and that defines a duct for passing the tube, and
an anchor for anchoring the coupling device in the socket,
the body having an end provided with a retractable ring, the retractable ring in a first position projecting axially from said end in order to carry internally an annular sealing member of the coupling device, and the retractable ring being movable from the first position to a second position in order to release the annular sealing member in the socket, and
wherein the retaining washer is arranged in the retractable ring between the body and the annular sealing member, and
wherein the retaining washer is radially outwardly surrounded by the retractable ring when the retractable ring is in the first and second positions.

2. The quick coupling device according to claim 1, wherein a spacer is mounted in the retractable ring between the annular sealing member and the retaining washer.

3. The quick coupling device according to claim 2, wherein the spacer is substantially annular in shape and includes a transversely-extending first face in contact with the annular sealing member and a second face opposite from the first face and including an internal chamfer.

4. The quick coupling device according to claim 2, wherein the outer peripheral surface of the spacer is provided with an annular groove.

5. The quick coupling device according to claim 1, wherein the retractable ring is connected to the tubular body by a breakable wall.

6. The quick coupling device according to claim 1, wherein the anchor comprises an externally-anchoring washer.

7. The quick coupling device according to claim 6, wherein the externally-anchoring washer is carried by the tubular disconnection pusher.

8. The quick coupling device according to claim 6, wherein the externally-anchoring washer has outwardly projecting teeth, the teeth being connected together in pairs by a flat circumferential portion that is elastically deformable in twisting to enable the teeth to move between a state for freely passing the tubular body in the socket and a state for anchoring the tubular body in the socket.

9. The quick coupling device according to claim 6, wherein the anchoring washer has teeth connected together by circumferential portions so as to be elastically deformable between a rest state in which the anchoring washer has an outside diameter greater than the diameter of the socket, and a deformed state in which the anchoring washer has an outside diameter less than the diameter of the socket, each tooth having a free portion with a terminal edge for biting into the wall of the socket and a portion that is connected to the circumferential portions, the free portion of each tooth being enlarged relative to the connected portion and the terminal edge including at least one portion for increasing stress concentration at a distance from the ends of the terminal edge.

10. The quick coupling device according to claim 9, wherein the terminal edge is a segment of a circle of diameter smaller than the diameter of the socket, the free portion of the tooth being convex in shape.

11. The quick coupling device according to claim 9, wherein the terminal edge has two end portions of convex rounded shape that are connected together via a central portion of concave rounded shape, between each of the end portions and the concave end portion, being in the shape of a spike.

12. The quick coupling device according to claim 1, wherein the end of the tubular disconnection pusher facing the tube retaining washer includes at least one axial slot.

13. A quick coupling device in the form of a cartridge for inserting in a socket of a circuit element for connection to a tube having a longitudinal axis, the device comprising:
a tubular body defining a channel,
a retaining washer for retaining the tube in the device,
a tubular disconnection pusher that is slidably mounted in the channel and that defines a duct for passing the tube, and
an anchor for anchoring the coupling device in the socket,
the body having an end provided with a retractable ring, the retractable ring in a first position projecting axially from said end in order to carry internally an annular sealing member of the coupling device, and the retractable ring being movable from the first position to a second position in order to release the annular sealing member in the socket, and
wherein the retaining washer is arranged in the retractable ring between the body and the annular sealing member,
wherein a spacer is mounted in the retractable ring between the annular sealing member and the retaining washer, and
wherein the spacer is substantially annular in shape and includes a transversely-extending first face in contact with the annular sealing member and a second face opposite from the first face and including an internal chamfer.

14. A quick coupling device in the form of a cartridge for inserting in a socket of a circuit element for connection to a tube having a longitudinal axis, the device comprising:
- a tubular body defining a channel,
- a retaining washer for retaining the tube in the device,
- a tubular disconnection pusher that is slidably mounted in the channel and that defines a duct for passing the tube, and
- an anchor for anchoring the coupling device in the socket,
- the body having an end provided with a retractable ring, the retractable ring in a first position projecting axially from said end in order to carry internally an annular sealing member of the coupling device, and the retractable ring being movable from the first position to a second position in order to release the annular sealing member in the socket,
- wherein the retaining washer is arranged in the retractable ring between the body and the annular sealing member,
- wherein a spacer is mounted in the retractable ring between the annular sealing member and the retaining washer, and
- wherein the outer peripheral surface of the spacer is provided with an annular groove.

\* \* \* \* \*